Dec. 18, 1956  J. C. WORD, JR  2,774,310
PUMP
Filed Feb. 20, 1953
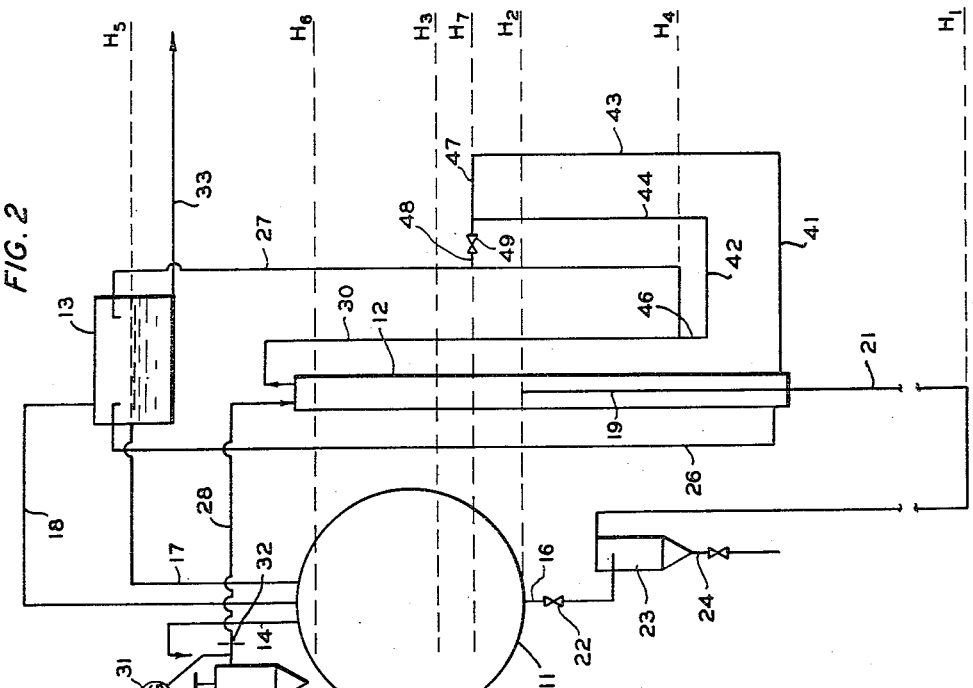
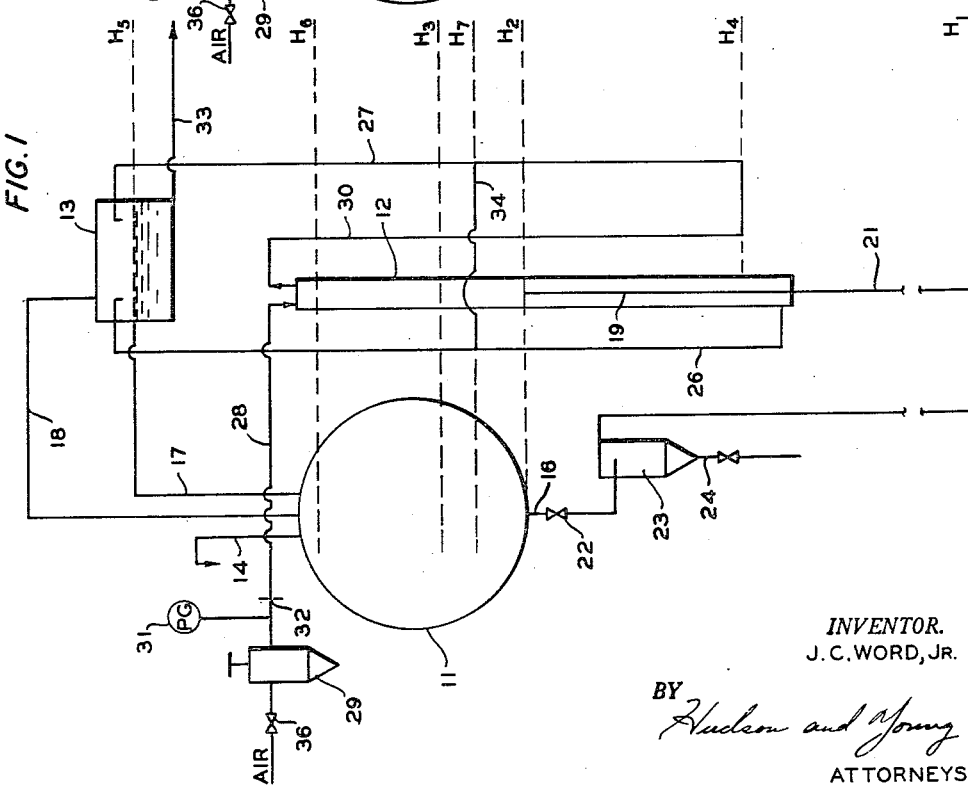
INVENTOR.
J. C. WORD, JR.
BY
Hudson and Young
ATTORNEYS

United States Patent Office 2,774,310
Patented Dec. 18, 1956

2,774,310

PUMP

James C. Word, Jr., Phillips, Tex., assignor to Phillips Petroleum Company, a corporation of Delaware Application February 20, 1953, Serial No. 338,069

6 Claims. (Cl. 103—234)

This invention relates to pumps. In a further aspect this invention relates to gas powered pumps, these being especially adaptable for applications in which corrosive materials are being transferred. In a further aspect this invention relates to a method for transferring liquid materials from one level to another.

I have found a new method by which liquid materials may be elevated. This method provides a pumping system which includes no moving parts, the pumping action being solely a result of the induction of gas pressure into certain components of the system. Such a system is particularly adaptable to the transfer of corrosive liquids, such as strong acids and alkalies because of the absence of moving parts. As an example of such an application, there may be mentioned the induction of sulfuric acid into refinery apparatus. Another place where my apparatus is especially useful is the induction of liquid materials into water purification systems and the like.

Each of the following objects is obtained by at least one of the aspects of this invention.

An object of this invention is to provide an improved pump. A further object of this invention is to provide a gas powered pump having no movable parts. A further object of this invention is to provide a gas powered pump in which gas is introduced continuously to provide the force for pumping. A further object of this invention is to provide a system for providing a constant level source of liquid material. A further object of this invention is to provide a method for pumping liquids.

Other objects and advantages will be apparent to one skilled in the art after reading this disclosure.

Accompanying this disclosure and forming a part thereof is a drawing comprising:

Figure 1, which constitutes a schematic diagram of this pump, and

Figure 2, which illustrates a modification of the pump shown in Figure 1.

In Figure 1, there is shown a supply tank or storage tank 11. Positioned alongside of this tank is a feed chamber 12 and, at a desired height from which it is desired to forward liquid material is a constant level tank 13. Storage tank 11 is provided with a vent stack 14 and a liquid material outlet 16 in the lower portion thereof. Connecting constant level tank 13 and storage tank 11 there are provided liquid return conduit 17 and vapor return conduit 18. Positioned inside of feed chamber 12, there is provided a conduit 19, this extending up to a level approximately even with the bottom of storage tank 11. The lower end of conduit 19 is connected to storage tank 11 by means of U-shaped conduit 21, this conduit containing a valve 22 and a sludge pot 23. Sludge pot 23 contains a sludge draw-off conduit 24. Extending from the lower portion of feed chamber 12 there is provided a line 26 which extends into constant level tank 13. Extending from the upper portion of feed chamber 12 there is a conduit 30, this conduit forming a U, the lower portion of this U being below the lower portion of storage tank 11 but above the lower end portion of feed chamber 12 and having upwardly extending leg 27 which communicates with constant level device 13. A source of gas under pressure is connected to the upper end portion of feed chamber 12 by means of line 28, this line containing a pressure regulator 29, a pressure gauge 31, and an orifice 32. Air is the most commonly used pressurizing gas, but, of course, other gases may be used. A valve 36 is provided in the gas supply line 28. A line 33 extends from the lower portion of constant level tank 13 to any desired point of utilization of the material being pumped. At approximately the lower level that will be found in storage tank 11, a conduit 34 connects line 26 and conduit 27.

Certain levels are identified on the drawing in order to aid in the understanding of the operation of this invention. These include:

$H_1$, the lowest level in conduit 21.
$H_2$, the bottom of storage tank 11.
$H_3$, a given level in storage tank 11.
$H_4$, the bottom of the U formed by conduits 30 and 27.
$H_5$, the desired level in constant level tank 13.
$H_6$, the upper level encountered in storage tank 11.
$H_7$, the lowest level to which storage tank 11 is to be drained.

In the operation of the device illustrated in Figure 1, the connections are made and valve 22, in the line extending from storage tank 11, is opened before valve 36 in the gas supply line 28. When this is done fluid from storage tank 11 flows by gravity through line 21 into internal line 19. This liquid overflows into chamber 12, and, as chamber 12 fills with liquid, line 26 also is filled until line 34 is reached. At this point liquid flows across line 34 into line 27, thus filling the loop formed by lines 30 and 27. Liquid in line 26, feed chamber 12, line 30 and line 27 continues to rise until the level reaches an equilibrium level, this being the level in storage tank 11. This is designated $H_6$ in Figure 1.

At this point, valve 22 being left open, valve 36 is opened and the actuating gas enters the system passing through pressure regulator 29 and orifice 32 into feed chamber 12 above the level $H_6$. Gas also enters line 30 from feed chamber 12. The liquid in chamber 12 and line 30 is forced downwardly because of the gas pressure and this causes the liquid to rise in conduit 26 and conduit 27. Liquid forced from the upper end of these last mentioned conduits flows into constant level tank 13.

As gas continues to enter feed chamber 12 and line 30, the level of liquid drops until it reaches the upper end of conduit 19, say at $H_2$. At this point there will be a descent of liquid in line 19 until the liquid head supported by the gas over line 19 is equal to the head of liquid supported by gas over chamber 12 and also equal to the head of liquid supported by the gas over liquid in line 30. When these heads of liquid become equal, continued inflow of gas forces the liquid down in line 19 into the storage tank 11, down the outer portion of chamber 12 surrounding conduit 19 and therefrom through line 26 into chamber 13, and down into line 30 forcing the liquid upwardly in line 27.

When sufficient gas has been introduced to force the liquid down to the lowermost point in conduit 30, the liquid seal is broken, and the gas, which has been under pressure in feed chamber 12, is allowed to escape. This allows liquid to flow from storage tank 11, through conduits 21 and 19 into feed chamber 12 by the force of gravity. The starting operation is substantially repeated as the liquid flowing into chamber 12 is allowed to rise in conduit 26 and, upon reaching level $H_7$ is allowed to again fill the loop formed by conduits 30 and 27. The gas, entering the system through conduit 28, continues to flow and builds up pressure above the liquid at the same time it is flowing into chamber 12. An equilibrium level is soon reached between the force forcing the liquid into feed chamber 12 and the gas entering the upper portion of this chamber. At this point the gas pressure becomes greater than that of the liquid and the pumping operation, previously described, is repeated as the liquid is forced downwardly in feed chamber 12.

As stated above, the lowest level of the bottom of the U in conduit 21 is at a level $H_1$. This level is established so that the lowest level in the supply tank, say $H_7$, and the distance to level $H_1$ is greater than the distance between the level $H_5$, the height to which pumped and the level $H_4$, the lowest level formed by conduits 30 and 27. In other words the distance from the lower level permitted in the tank and the bottom of the U between the tank and the feed chamber should be greater than the distance between the lower level of conduit 27 and the upper end of this conduit. It will be seen that this is necessary so that the head of liquid in line 27 is less than that in line 21 so that the liquid seal wil blow, instead of the seal extending into storage tank 11.

Material is withdrawn from constant level tank 13 by means of conduit 33. Liquid overflow from this tank is returned to storage tank 11 by means of conduit 17 and conduit 18 serves as a vapor return conduit. It will be obvious that conduits 17 and 18 could have a common physical structure, but these are shown as separate conduits in order to make the function of such conduits clear. The liquid level in constant level tank 13 is maintained constant at any desired level $H_5$ by pumping liquid thereinto at a rate at least equal to the rate at which it is withdrawn through conduit 33. Preferably, an excess of liquid is pumped into this tank and the overflod returned to storage tank 11 by means of conduit 17.

Figure 2 illustrates a modification of my invention in which an auxiliary, internal loop seal is provided. In this drawing most of the parts are the same as they are in the modification shown in Figure 1, and they are correspondingly numbered. This modification eliminates conduit 34, and replaces this with an inverted U-shaped conduit, this being made up by horizontal lines 41 and 42, and vertical lines 43, 44 and 46. The upper end of this inverted U-shaped seal 47 is positioned at approximately the level of conduit 34 shown in Figure 1, this, in turn, being level $H_7$, the lower lever to which it is desired to drain storage tank 11. Connecting the upper end 47, off this loop and conduit 27 is conduit 48, this being provided with valve 49. Conduit 41 extends from the lower end portion of feed chamber 12 and connects with upwardly extending leg 43. Conduit 44 is the downwardly extending leg of this internal loop seal, this being connected to the lower portion of the loop formed by conduits 30 and 27 by means of conduits 42 and 46.

The operation of the system disclosed in Figure 2 is fundamentally similar to that shown in Figure 1. In this modification, when valves 22 and 49 are opened, liquid flows from storage tank 11 into the various conduits until equilibrium is reached. This flow is through conduits 21 and 19 and into feed chamber 12. From chamber 12 the liquid flows into conduit 26 and the internal loop seal formed by conduits 41, 43, 47, 44, 42, 46 and therefrom into the seal loop formed by conduits 30 and 27. When this equilibrium is reached, valve 49 is closed, valve 36 is opened and gas enters the system through line 28. Similarly to the operation of Figure 1, this gas forces the liquid downwardly in feed chamber 12, at the same time forcing it downwardly in conduit 30 and upwardly in conduit 26. Liquid continues to flow through 26 until sufficient pressure has been built up to blow the liquid seal formed by conduits 30 and 27. At this point the gas pressure is lost and liquid begins to flow from storage tank 11 into the system so that the operation is continuous. Liquid from the internal loop seal formed by conduits 43 and 44 flows into the loop seal formed by conduits 30 and 27, again establishing this seal so that pumping again takes place. The use of the internal loop seal shown in Figure 2 is especially necessary when conduits of small size are used in this pump because, without this second loop, there is a tendency for gas binding to develop.

It will be apparent that the inlet and outlet sections of feed chamber 12 could be reversed so that the liquid from storage tank 11 first flows into the outer section of feed chamber 12 and is pumped therefrom from the inner section of this feed chamber. In this case conduit 21 would be connected to this outer section, and conduit 26, and conduit 41 in Figure 2, would be connected with the lower end portion of conduit 19.

The capacity of the system is dependent upon the volume of feed chamber 12 and, within certain limits, the pressure or rate of flow of the driving gas. Because of the costs involved, it is usually preferable to use air as this driving gas. However, it should be noted that where a liquid is one which would be affected by air, a different gas could, of course, be used.

As many possible embodiments may be made of this invention without departing from the scope thereof, it is to be understood that all matter herein set forth or shown in the accompanying drawing is to be interpreted as illustrative and not in a limiting sense.

I claim:

1. A gas powered pump comprising, in combination, a storage tank; a vent conduit in the upper end portion of said storage tank; a liquid outlet in the lower end portion of said storage tank; a sludge pot below said storage tank, a conduit connecting the liquid outlet of said tank and said sludge pot; means defining a feed chamber positioned beside said storage tank, the top of said feed chamber being at approximately the level of the top of said storage tank and the bottom of said feed chamber being below the bottom of said storage tank; a constant level device located at a level above said storage tank; a vapor return conduit extending from the upper end of said constant level device to the upper portion of said storage tank; a liquid overflow line extending from the central portion of said constant level device to said storage tank; a conduit extending from said constant level device to a point of consumption; a conduit extending from the lower end portion of said feed chamber to said constant level device; a first U-shaped conduit comprising a first leg communicating with the upper end portion of said feed chamber and a second leg communicating with said constant level device. the bottom of said first U-shaped conduit being at a level above the lower end portion of said feed chamber, means in addition to said conduit extending from the lower end portion of said feed chamber to said constant level device to supply liquid being pumped from said feed chamber to said first U-shaped conduit; a second U-shaped conduit extending from the upper end portion of said sludge pot up into the said feed chamber, the end of said conduit in said feed chamber being at a level approximately equal to the lower end portion of said supply tank and the distance between the upper end of the conduit extending into said feed chamber and the lower portion of said second U-shaped conduit being greater than the length of the second leg of said first U-shaped conduit; and a gas supply conduit communicating with the upper end portion of said feed chamber for introducing gas thereto.

2. A gas powered pump comprising, in combination, a storage tank; a vent conduit in the upper end portion of said storage tank; a liquid outlet in the lower end portion of said storage tank; a sludge pot below said storage tank, a conduit connecting the liquid outlet of said tank and said sludge pot; means defining a feed chamber positioned beside said storage tank, the top of said feed chamber being at approximately the level of the top of said storage tank and the bottom of said feed chamber being below the bottom of said storage tank; a constant level device located at a level above said storage tank; a vapor return conduit extending from the upper end of said constant level device to the upper portion of said storage tank; a liquid overflow line extending from the central portion of said constant level device to said storage tank; a conduit extending from said constant level device to a point of consumption; a conduit extending from the lower end portion of said feed chamber to said constant level device; a first U-shaped conduit comprising a first leg communicating with the upper end portion of said feed chamber and a second leg communicating with said constant level device, the bottom of said first U-shaped conduit being at a level above the lower end portion of said feed chamber, means in addition to said conduit extending from the lower end portion of said feed chamber to said constant level device to supply liquid being pumped from said feed chamber to said first U-shaped conduit; a second U-shaped conduit extending from the upper end portion of said sludge pot up into the said feed chamber, the end of said conduit in said feed chamber being at a level approximately equal to the lower end portion of said supply tank and the distance between the upper end of the conduit extending into said feed chamber and the lower portion of said second U-shaped conduit being greater than the length of said second leg of said first U-shaped conduit; a gas supply conduit communicating with the upper end portion of said feed chamber for introducing gas thereto; a pressure regulator in said gas supply conduit; and a restriction orifice in said gas supply conduit.

3. A gas powered pump comprising, in combination, a storage tank; a vent conduit in the upper end portion of said storage tank; a liquid outlet in the lower end portion of said storage tank; a sludge pot below said storage tank, a conduit connecting the liquid outlet of said tank and said sludge pot; means defining a feed chamber positioned beside said storage tank, the top of said feed chamber being at approximately the level of the top of said storage tank and the bottom of said feed chamber being below the bottom of said storage tank; a constant level device located at a level above said storage tank; a vapor return conduit extending from the upper end of said constant level device to the upper portion of said storage tank; a liquid overflow line extending from the central portion of said constant level device to said storage tank; a conduit extending from said constant level device to a point of consumption; a conduit extending from the lower end portion of said feed chamber to said constant level device; a first U-shaped conduit comprising a first leg communicating with the upper end portion of said feed chamber and a second leg communicating with said constant level device, the bottom of said first U-shaped conduit being at a level above the lower end portion of said feed chamber; an inverted U-shaped conduit extending from the lower end portion of said feed chamber to the lower end portion of said first U-shaped conduit, the upper end of said inverted U-shaped conduit being at approximately the level of the lower portion of said supply tank and the downstream end of said inverted U-shaped conduit extending below the lower portion of said first U-shaped conduit; a conduit connecting the upper end portion of said inverted U-shaped conduit and said first U-shaped conduit at approximately the level of the upper end portion of said inverted U-shaped conduit; a valve in said last named conduit; a third U-shaped conduit extending from the upper end portion of said sludge pot up into the said feed chamber, the end of said conduit in said feed chamber being at approximately the level of the lower end portion of said supply tank and the distance between the upper end of the conduit extending into said feed chamber and the lower portion of said third U-shaped conduit being greater than the length of the second leg of said first U-shaped conduit; a gas supply conduit communicating with the upper end portion of said feed chamber for introducing gas thereto; a pressure regulator in said gas supply conduit; and a restriction orifice in said gas supply conduit.

4. A gas powered pump comprising, in combination, a storage tank; a vent conduit in the upper end portion of said storage tank; a liquid outlet in the lower end portion of said storage tank; a sludge pot below said storage tank, a conduit connecting the liquid outlet of said tank and said sludge pot; means defining a feed chamber positioned beside said storage tank, the top of said feed chamber being at approximately the level of the top of said storage tank and the bottom of said feed chamber being below the bottom of said storage tank; a constant level device located at a level above said storage tank; a vapor return conduit extending from the upper end of said constant level device to the upper portion of said storage tank; a liquid overflow line extending from the central portion of said constant level device to said storage tank; a conduit extending from said constant level device to a point of consumption; a conduit extending from the lower end portion of said feed chamber to said constant level device; a first U-shaped conduit comprising a first leg communicating with the upper end portion of said feed chamber and a second leg communicating with said constant level device; the bottom of said first U-shaped conduit being at a level above the lower end portion of said feed chamber; a conduit connecting said conduit extending from the lower end portion of said feed chamber to said constant level device and the downstream leg of said first U-shaped conduit at approximately the level of the lower end portion of said supply tank; a second U-shaped conduit extending from the upper end portion of said sludge pot up into the said feed chamber, the end of said conduit in said feed chamber being at approximately the level of the lower end portion of said supply tank and the distance between the upper end of the conduit extending into said feed chamber and the lower portion of said second U-shaped conduit being greater than the length of the second leg of said first U-shaped conduit; a gas supply conduit communicating with the upper end portion of said feed chamber for introducing gas thereto; a pressure regulator in said gas supply conduit; and a restriction orifice in said gas supply conduit.

5. A gas powered pump comprising, in combination, a liquid supply source; means defining a feed chamber positioned beside said source of supply, the bottom of said feed chamber being below the level of said source of supply; a discharge conduit extending from the lower end portion of said feed chamber; a first U-shaped conduit having a first leg communicating with the upper end portion of said feed chamber and a second leg extending to a point of discharge, the lower portion of said first U-shaped conduit being above the level at which said discharge conduit communicates with said feed chamber; means in addition to said discharge conduit extending from the lower end portion of said feed chamber adapted to supply liquid being pumped to said first U-shaped conduit; a second U-shaped conduit extending from said source of supply and up into said feed chamber, the end of said second U-shaped conduit extending into said feed chamber being at a level not higher than the lowest level of said source of supply and the distance between the upper end of the conduit extending into said feed chamber and the lower portion of said second U-shaped conduit being greater than the length of said second leg of said first U-shaped conduit; and a gas supply conduit communicating with the upper end portion of said feed chamber for introducing gas thereto.

6. A gas powered pump comprising, in combination, a storage tank; a liquid outlet in the lower end portion of said storage tank for removing liquid therefrom; means defining a feed chamber positioned beside said storage tank, the bottom of said feed chamber being below the bottom of said storage tank; a discharge conduit extending from the lower end portion of said feed chamber; a first U-shaped conduit having a first leg communicating with the upper end portion of said feed chamber and a second leg extending to a point of discharge, the lower portion of said first U-shaped conduit being above the level at which said discharge conduit communicates with said feed chamber; means in addition to said discharge conduit extending from the lower end portion of said feed chamber adapted to supply liquid being pumped to said first U-shaped conduit; a second U-shaped conduit extending from the liquid outlet in said storage tank and up into said feed chamber, the end of said second U-shaped conduit extending into said feed chamber being at a level not higher than the lowest level to which said storage tank is to be drained and the distance between the upper end of the conduit extending into said feed chamber and the lower portion of said second U-shaped conduit being greater than the length of the second leg of said first U-shaped conduit; and a gas supply conduit communicating with the upper end portion of said feed chamber for introducing gas thereto.

No references cited.